United States Patent
Swarup et al.

(10) Patent No.: US 8,440,746 B2
(45) Date of Patent: May 14, 2013

(54) ONE COMPONENT EPOXY STRUCTURAL ADHESIVE COMPOSITION PREPARED FROM RENEWABLE RESOURCES

(75) Inventors: Shanti Swarup, Allegheny County, PA (US); Masayuki Nakajima, Allegheny County, PA (US); Umesh C. Desai, Allegheny County, PA (US); Tien-Chieh Chao, Allegheny County, PA (US); Charles M. Kania, Allegheny County, PA (US); Britt Minch, Lake County, OH (US)

(73) Assignee: PPG Industries Ohio, Inc, Cleveland, OH (US)

( * ) Notice: Subject to any disclaimer, the term of this patent is extended or adjusted under 35 U.S.C. 154(b) by 242 days.

(21) Appl. No.: 12/958,460

(22) Filed: Dec. 2, 2010

(65) Prior Publication Data

US 2012/0142817 A1 Jun. 7, 2012

(51) Int. Cl.
| | |
|---|---|
| *C09J 163/08* | (2006.01) |
| *C09J 163/00* | (2006.01) |
| *C09J 163/02* | (2006.01) |
| *C09J 163/04* | (2006.01) |
| *C09J 163/10* | (2006.01) |
| *B32B 27/38* | (2006.01) |

(52) U.S. Cl.
USPC ............ 523/428; 523/427; 523/436; 156/330

(58) Field of Classification Search ................. 156/325, 156/326, 327, 328, 330; 428/413, 414, 415, 428/416, 417, 418; 523/400, 427, 428, 436; 525/523, 524, 525, 526, 528, 529, 530, 531, 525/533
See application file for complete search history.

(56) References Cited

U.S. PATENT DOCUMENTS

| | | | |
|---|---|---|---|
| 2004/0058181 A1 | 3/2004 | Garnault et al. | |
| 2005/0070634 A1* | 3/2005 | Lutz et al. | 523/427 |
| 2005/0209401 A1 | 9/2005 | Lutz et al. | |
| 2008/0051524 A1 | 2/2008 | Ji et al. | |
| 2008/0188609 A1 | 8/2008 | Agarwal et al. | |
| 2009/0294057 A1 | 12/2009 | Liang et al. | |
| 2010/0130655 A1 | 5/2010 | Agarwal et al. | |
| 2010/0234516 A1 | 9/2010 | Burns et al. | |

FOREIGN PATENT DOCUMENTS

| | | |
|---|---|---|
| JP | 06287411 A | 10/1994 |
| WO | WO 2006128722 A1 | 12/2006 |
| WO | WO 2009115586 A1 | 9/2009 |

\* cited by examiner

*Primary Examiner* — Michael J Feely
(74) *Attorney, Agent, or Firm* — Krisanne Shideler

(57) ABSTRACT

Curable, one-package, stable adhesive compositions are provided comprising:
(a) a resin component comprising a polyepoxide,
(b) a polyamine having at least two primary amine, secondary amine, and/or ketimine functional groups; and
(c) a curing component comprising dicyandiamide and an accelerator. At least a portion of the polyepoxide in the resin component is reacted with carboxy-terminated butadiene acrylonitrile polymer. The accelerator comprises a reaction product comprising a renewable polyol, a diisocyanate, and a dialkyl monoamine containing alkyl groups with at least two carbon atoms each. The compositions are suitable for use as adhesive compositions over a wide temperature range.

18 Claims, No Drawings

ONE COMPONENT EPOXY STRUCTURAL ADHESIVE COMPOSITION PREPARED FROM RENEWABLE RESOURCES

FIELD OF THE INVENTION

The present invention relates to curable, one-package, stable adhesive compositions suitable for use at a wide range of temperatures.

BACKGROUND OF THE INVENTION

Research and development efforts in the industrial adhesives industry are increasingly focused on high performance adhesives that are effective at extreme temperature ranges. Wedge Impact Peel resistance is a critical criterion for high strength structural adhesives for substrates such as HDG and aluminum, at temperatures as low as −40° C. Developing adhesive compositions that demonstrate peel resistance over a wide temperature range, while additionally maintaining toughness and stability (shelf life) is particularly desirable.

However, the price of raw materials used in many manufacturing processes continues to rise, particularly those whose price rises or falls with the price of oil. Because of this, and because of the uncertainty of oil reserves, raw materials derived from renewable resources or alternative resources are being considered in many manufacturing processes. An increase in demand for environmentally friendly products, together with the uncertainty of the variable and volatile petrochemical market, has promoted the development of raw materials from renewable and/or inexpensive sources.

SUMMARY OF THE INVENTION

The present invention is directed to curable, one-package, stable adhesive compositions. The compositions comprise:
(a) a resin component comprising a polyepoxide,
(b) a polyamine having at least two primary amine, secondary amine, and/or ketimine functional groups; and
(c) a curing component comprising dicyandiamide and an accelerator. At least a portion of the polyepoxide in the resin component (a) is reacted with carboxy-terminated butadiene acrylonitrile polymer. The accelerator comprises a reaction product comprising (i) a renewable polyol, (ii) a diisocyanate, and (iii) a dialkyl monoamine containing alkyl groups with at least two carbon atoms each. The compositions are suitable for use as adhesive compositions.

DETAILED DESCRIPTION OF THE INVENTION

Other than in any operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used in this specification and the appended claims, the articles "a," "an," and "the" include plural referents unless expressly and unequivocally limited to one referent.

The various embodiments and examples of the present invention as presented herein are each understood to be non-limiting with respect to the scope of the invention.

As used in the following description and claims, the following terms have the meanings indicated below:

By "polymer" is meant a polymer including homopolymers and copolymers, and oligomers. By "composite material" is meant a combination of two or more differing materials.

The term "curable", as used for example in connection with a curable composition, means that the indicated composition is polymerizable or cross linkable through functional groups, e.g., by means that include, but are not limited to, thermal (including ambient cure) and/or catalytic exposure.

The term "cure", "cured" or similar terms, as used in connection with a cured or curable composition, e.g., a "cured composition" of some specific description, means that at least a portion of the polymerizable and/or crosslinkable components that form the curable composition is polymerized and/or crosslinked. Additionally, curing of a polymerizable composition refers to subjecting said composition to curing conditions such as but not limited to thermal curing, leading to the reaction of the reactive functional groups of the composition, and resulting in polymerization and formation of a polymerizate. When a polymerizable composition is subjected to curing conditions, following polymerization and after reaction of most of the reactive end groups occurs, the rate of reaction of the remaining unreacted reactive end groups becomes progressively slower. The polymerizable composition can be subjected to curing conditions until it is at least partially cured. The term "at least partially cured" means subjecting the polymerizable composition to curing conditions, wherein reaction of at least a portion of the reactive groups of the composition occurs, to form a polymerizate. The polymerizable composition can also be subjected to curing conditions such that a substantially complete cure is attained and wherein further curing results in no significant further improvement in polymer properties, such as hardness.

The term "reactive" refers to a functional group capable of undergoing a chemical reaction with itself and/or other functional groups spontaneously or upon the application of heat or in the presence of a catalyst or by any other means known to those skilled in the art.

"Renewable" polymers such as renewable polyols; plastics; and other materials such as renewable fatty acids are manufactured from renewable sources; i.e., theoretically, the raw materials used to manufacture the polymers and plastics will not run out. ASTM D6866 "Standard Test Methods for Determining the Biobased Content of Natural Range Materials Using Radiocarbon and Isotope Ratio Mass Spectrometry Analysis" is a test method which determines the percentage of a product that comes from renewable resources.

Biomass is renewable; e.g., more plants can be grown to replace those that are used. A biomass-derived compound will be understood to be a compound derived from a living or recently living organism; for example, plants (including trees) or animals, and not from a petroleum-based source. Chemicals, including monomers for polymer production, may be derived from biomass. Polymers made from these monomers are, therefore, renewable polymers; they can be replaced by growing more biomass and then repeating the manufacturing process. Examples of commonly used renewable polymers include starch and polylactic acid.

The term "biobased" material as used herein refers to an organic material in which the carbon is derived from a renewable resource via biological processes. Biobased materials include all plant and animal mass derived from $CO_2$ recently fixed via photosynthesis, per definition of a renewable resource. Biobased materials may or may not be biodegradable or compostable.

As used herein, the term "stable" means that when a sample of the composition is aged at room temperature for 8 weeks, the viscosity of the sample measured at 55° C. increases by no more than 50%, when measured using a PHYSICA MCR 301 rheometer with a 25 mm plate and 0.7 mm gap, at 10 $s^{-1}$.

The curable compositions of the present invention comprise (a) a resin component containing a polyepoxide; i.e., one or more epoxy-functional polymers, each polymer typically having at least two epoxide or oxirane groups per molecule. As used herein, "epoxy-functional polymers" means epoxy-functional oligomers, polymers and/or copolymers. These materials often are referred to as diepoxides (when there are two epoxide functional groups) or polyepoxides (when there are two or more epoxide functional groups). Generally, the epoxide equivalent weight of the polyepoxide can range from about 70 to about 4,000, and usually about 140 to about 600, as measured by titration with perchloric acid and quaternary ammonium bromide using methyl violet as an indicator.

Suitable epoxy-functional polymers can be saturated or unsaturated, cyclic or acyclic, aliphatic, alicyclic, aromatic or heterocyclic. The epoxy-functional polymers can have pendant or terminal hydroxyl groups, if desired. They can contain substituents such as halogen, hydroxyl, and ether groups. A useful class of these materials includes polyepoxides comprising epoxy polyethers obtained by reacting an epihalohydrin (such as epichlorohydrin or epibromohydrin) with a di- or polyhydric alcohol in the presence of an alkali. Suitable polyhydric alcohols include polyphenols such as resorcinol; catechol; hydroquinone; bis(4-hydroxyphenyl)-2,2-propane, i.e., bisphenol A; bis(4-hydroxyphenyl)-1,1-isobutane; 4,4-dihydroxybenzophenone; bis(4-hydroxyphenol)-1,1-ethane; bis(2-hydroxyphenyl)-methane and 1,5-hydroxynaphthalene.

Frequently used polyepoxides include polyglycidyl ethers of Bisphenol A, such as EPON® 828 epoxy resin which is commercially available from Hexion Specialty Chemicals, Inc. EPON® 828 epoxy resin has a number average molecular weight of about 400 and an epoxy equivalent weight of about 185-192. Other useful polyepoxides include polyglycidyl ethers of other polyhydric alcohols, polyglycidyl esters of polycarboxylic acids, polyepoxides that are derived from the epoxidation of an olefinically unsaturated alicyclic compound, polyepoxides containing oxyalkylene groups in the epoxy molecule, epoxy novolac resins, and polyepoxides that are partially defunctionalized by carboxylic acids, alcohol, water, phenols, mercaptans or other active hydrogen-containing compounds to give hydroxyl-containing polymers. These polyepoxides are well known to those skilled in the art and are described in U.S. Pat. No. 4,739,019 at column 2, line 6 through column 3, line 12.

The amount of the epoxy-functional polymer in the curable composition can vary depending in part upon the intended application of the composition. In a typical embodiment, the polyepoxide is present in an amount ranging from 60 to 95 percent by weight, based on the total weight of the curable composition, usually 50 to 85 percent by weight, and often 70 to 80 percent by weight.

Typically, the polyepoxides are present as liquids or dispersions, although combinations of liquid and solid epoxy-functional polymers can be used as long as the desired viscosity of the curable composition is obtained from the other components of the composition.

Usually, at least a portion, often at least 5 percent by weight, of the polyepoxide has been reacted with a carboxy-terminated butadiene acrylonitrile polymer. Such carboxy-terminated butadiene acrylonitrile polymers often have an acrylonitrile content of 10 to 26 percent by weight. The polyepoxide may be reacted with a mixture of different carboxy-terminated butadiene acrylonitrile polymers.

In certain embodiments of the present invention, the resin component (a) further comprises an additional resin that is a reaction product comprising any of the polyepoxides described above and dimer acid. Dimer acids, or dimerized fatty acids, are dicarboxylic acids prepared by dimerizing on clay catalysts unsaturated fatty acids such as those obtained from tall oil, a renewable source. Tall oil is a by-product of the Kraft process of wood pulp manufacture when pulping, for example, coniferous trees. Dimer acid usually contains predominantly a dimer of stearic acid. It is also called C36 dimer acid. A suitable dimer acid is available from Croda, Inc. or Cognis. In alternative embodiments, the resin component (a) further comprises an additional resin that is a reaction product comprising epichlorohydrin and any carboxy-terminated butadiene acrylonitrile polymer such as is described above. The resin component may also additionally comprise a polyester polymer. The polyester polymer may be prepared from polyols and polyacids, including polyanhydrides, as known in the art. It is particularly useful to prepare the polyester polymer from renewable sources. For example, hydroxyl functional polyesters derived from corn resins and hydroxyl functional polyester derived from natural oils such as castor oil, peanut oil, soy bean oil or canola oil are suitable. Polyesters made from renewable acids such as itaconic acid derived from potatoes are suitable. Other renewable polyester polymers disclosed below may be used. Also, the polyester may be prepared from renewable polyols, including any of those disclosed below. All of these additional resins may be used separately or in combination, and when used are present in a total amount of 1 to 35 percent by weight, based on the total weight of resin solids in the resin component (a).

The curable composition also comprises (b) a polyamine having at least two primary amine, secondary amine, and/or ketimine functional groups. Examples include aliphatic, cycloaliphatic, and aromatic polyfunctional amines such as ethylene diamine, diethylene triamine, dipropylenetriamine, triethylene tetramine, tetraethylene pentamine, 1,4-diaminobutane, 1,3-diaminobutane, hexamethylene diamine, 3-(N-isopropylamino)propylamine, diaminocyclohexane, polyoxyalkylene amines (i.e., polyethers having at least two primary amine, secondary amine, and/or ketimine functional groups such as those commercially available from Huntsman Corporation under the trademark designation JEFFAMINE®), meta-phenylene diamine, p,p'-methylene dianiline, and 1,4-aminonaphthalene. Analogous ketimines are also suitable. Amino functional alkyltrialkylsilane such as 3-aminopropyltrimethoxysilane can also be used as an additive.

In a typical embodiment, the polyamine (b) is present in an amount ranging from 0.2 to 10 percent by weight, based on the total weight of the curable composition, usually 0.5 to 5 percent by weight, and often 1 to 4 percent by weight.

The equivalent ratio of amine functional groups in the polyamine (b) to epoxy functional groups in the polyepoxide of the resin component (a) is usually between 0.05:1 and 0.5:1. It is possible to pre-react at least a portion, often at least 5 percent by weight, of the polyepoxide in the resin component (a) with the amine polymer (b) to form a prepolymer prior to preparation of the curable composition. Such a pre-reaction often improves the shelf life of the composition while not compromising adhesion performance.

The curable composition of the present invention further comprises (c) a curing component comprising dicyandiamide and an accelerator. The accelerator in turn comprises a reaction product comprising a renewable polyol, a diisocyanate, and a dialkyl monoamine containing alkyl groups with at least two carbon atoms each.

The polyol used to prepare the accelerator comprises a renewable polyol, often a renewable, hydroxyl functional polymer. Any known renewable polyols may be used. A biomass derived polyol (also referred to sometimes herein as "biobased polyol") is an example of a renewable polyol that is derived directly from biomass or that is prepared from one or more biomass derived compounds.

Any suitable biomass derived polyol can be used according to the present invention. Suitable polyols often have a number average molecular weight as determined by GPC ("Mn") of 500 to 100,000, such as 1500 to 10,000. In certain embodiments, the polyol can have a hydroxyl value of 20 to 400, such as 40 to 300, or 120 to 350. In certain other embodiments, the hydroxyl value can range from 1200 to 2100, such as 1400 to 1900. The polyols can be derived from natural oils such as castor oil, peanut oil, soy bean oil or canola oil. The hydroxyl groups present in the biomass derived polyols can be naturally occurring or they can be introduced, for example, by modification of carbon-carbon double bonds present in the oils. Natural oil derived polyols are described in United States Patent Publication Number 2006/0041156 A1, U.S. Pat. No. 7,084,230, WO 2004/096882 A1, U.S. Pat. No. 6,686,435, U.S. Pat. No. 6,107,433, U.S. Pat. No. 6,573,354 and U.S. Pat. No. 6,433,121, all of which are incorporated in their entirety herein. Methods of modifying carbon-carbon double bonds to introduce hydroxyl groups include treatment with ozone, air oxidation, reaction with peroxides or hydroformylation (as described in "Polyols and Polyurethanes from Hydroformylation of Soybean Oil", Journal of Polymers and the Environment, Volume 10, Numbers 1-2, pages 49-52, April, 2002, incorporated herein in its entirety). A particularly suitable biomass derived polyol is a soy polyol. Soy polyols are commercially available from Cargill Inc., Urethane Soy Systems Co. and BioBased Technologies LLC. The biomass derived polyol can also comprise recycled polyester, for example recycled polyethylene terephthalate (PET). Biomass derived polyols can be obtained by reacting recycled PET with polyols, for example soy polyol and glycerol, under conditions that lead to transesterification. Specific examples of other renewable polymers include starch-based polymers; an example is Materbi®, manufactured by Novamont; cellulose such as Natureflex®, manufactured by Innovia films; polyhydroxyalkanoates including plant-derived sugars or lipids; hydroxyl functional polyesters derived from corn resins; hydroxyl functional polyurethane or polyester derived from natural oils such as castor oil, peanut oil, soy bean oil or canola oil; thermoplastic starch (TPS), poly-β-hydroxybutyric acid (PHB), and the like. Combinations of renewable polymers are also suitable.

The diisocyanate used to prepare the accelerator may be a monomeric diisocyanate, a biuret, or a polymeric diisocyanate. Biurets of any suitable diisocyanate including 1,4-tetramethylene diisocyanate and 1,6-hexamethylene diisocyanate may be used in the preparation of the accelerator. Also, biurets of cycloaliphatic diisocyanates such as isophorone diisocyanate and 4,4'-methylene-bis-(cyclohexyl isocyanate) can be employed. Examples of suitable aralkyl diisocyanates from which biurets may be prepared are meta-xylylene diisocyanate and α,α,α',α'-tetramethylmetaxylylene diisocyanate. The diisocyanates themselves may also be used in the preparation of the accelerator.

The diisocyanate may also be one of those disclosed above, chain extended with one or more diamines and/or diols using suitable materials and techniques known to those skilled in the art.

The monoamine used to prepare the accelerator is a dialkyl monoamine containing alkyl groups with at least two carbon atoms each. Examples include diethylamine, diisopropylamine, dibutylamine, ethylhexylamine, dicyclohexylamine, and the like.

In certain embodiments of the present invention, the accelerator further comprises a polyurea functional reaction product comprising a polyamine, a diisocyanate such as any of those disclosed above, and a dialkyl monoamine containing alkyl groups with at least two carbon atoms each. Examples include those listed above. Suitable polyamines include monomeric and polymeric polyamines. Examples of suitable monomeric diamines include aliphatic diamines such as ethylene diamine, 1,2-diaminopropane, 1,4-diaminobutane, 1,3-diaminopentane, 1,6-diaminohexane, 2-methyl-1,5-pentane diamine, 2,5-diamino-2,5-dimethylhexane, 2,2,4- and/or 2,4,4-trimethyl-1,6-diamino-hexane, 1,11-diaminoundecane, 1,12-diaminododecane, 1,3- and/or 1,4-cyclohexane diamine, 1-amino-3,3,5-trimethyl-5-aminomethyl-cyclohexane, 2,4- and/or 2,6-hexahydrotoluoylene diamine, 2,4'- and/or 4,4'-diamino-dicyclohexyl methane and 3,3'-dialkyl-4,4'-diamino-dicyclohexyl methanes (such as 3,3'-dimethyl-4,4'-diamino-dicyclohexyl methane and 3,3'-diethyl-4,4'-diamino-dicyclohexyl methane), 2,4- and/or 2,6-diaminotoluene and 2,4'- and/or 4,4'-diaminodiphenyl methane, or mixtures thereof. Cycloaliphatic diamines are available commercially from Huntsman Corporation (Houston, Tex.) under the designation of JEFFLINK such as JEFFLINK 754. Additional aliphatic cyclic polyamines may also be included, such as DESMOPHEN NH 1520 cited above, and/or CLEARLINK 1000, which is a secondary aliphatic diamine available from DorfKetal. POLYCLEAR 136 (available from BASF/Hansen Group LLC) and HXA CE425 (available from Hansen Group LLC), the reaction product comprising isophorone diamine and acrylonitrile, is also suitable. Alternatively, the polyamine component may comprise a polyether functional polyamine, such as a diamine, and in particular, triamines and tetra-amines. Examples of suitable polyether functional polyamines include those sold under the name JEFFAMINE, available from Huntsman Corporation.

In particular embodiments, the polyurea functional reaction product comprises a reaction product comprising a polyether functional polyamine having at least two amine functional groups; a diisocyanate; and a dialkyl monoamine comprising dicyclohexylamine, diethylamine, diisopropyl amine, and/or dibutylamine.

The accelerator is typically present in the composition in an amount ranging from 0.5 to 30 percent by weight, based on the total weight of the composition.

In certain embodiments of the present invention, the curing component (c) further comprises a urea functional compound and/or an imidazole functional compound. Urea functional compounds include phenyl dimethyl urea, toluene dimethyl urea, cycloaliphatic bisurea, N-(3,4-dichlorophenyl)-N,N-dimethyl urea; 4,4'-methylene bis(phenyl dimethylurea) and the like. An example of a suitable amine functional compound is 6-(2-(2-methyl-1H-imidazol-1-yl)ethyl)-1,3,5-triazine-2, 4-diamine.

The curable composition may contain optional ingredients to improve certain properties of the composition upon curing. For example, the composition may contain a fibrous filler. Fibrous reinforcing agents in the composition of the present invention may be milled glass fibers, milled carbon fibers, or mixtures thereof. The milled fibers are typically about 1/16 inch (1.59 mm) in length. When used, the fibrous filler is present in an amount ranging from 1 to 15 percent by weight, based upon total weight of the composition.

The curable composition of the present invention may further comprise a filler. Examples of fillers that can be present include finely divided minerals such as clay, mica, dolomite, talc, zinc borate, magnesium carbonate, calcium oxide, calcium carbonate, calcium silicate, and/or calcium metasilicate. Examples of synthetic fillers are precipitated calcium carbonate and silica. When present, the filler is used in an amount ranging from 1 to 40 percent by weight based on the total weight of the composition.

In certain embodiments of the present invention, the composition is essentially free of fillers. In particular, the composition may be essentially free of fillers that do not act as thixotropes. For the purposes of this invention, inorganic additive pigments are not considered mineral fillers.

The curable compositions of the present invention can include a variety of optional ingredients and/or additives that are somewhat dependent on the particular application of the curable composition, such as pigments including carbon black or graphite, reinforcements, thixotropes, accelerators, surfactants, plasticizers, extenders, oligomers such as urethane and acrylates stabilizers, corrosion inhibitors, diluents, antioxidants, and chemical blowing agents. Suitable thixotropes include fumed silica, bentonite, stearic acid-coated calcium carbonate, polyamide, and fatty acid/oil derivatives. Thixotropes are generally present in an amount of up to about 7 weight percent. Generally, the amount of an inorganic extender can be up to about 50 weight percent based upon the total weight of the curable composition. Optional additional ingredients such as carbon black or graphite, surfactants and corrosion inhibitors are present if required in an amount of less than about 5 weight percent of the total weight of the curable composition.

Diluents and plasticizers can be present in an amount of up to about 50 weight percent of the total weight of the curable composition. Examples of suitable diluents include low molecular weight (from about 100 to about 2000) aliphatic or aromatic ester compounds containing one or more ester linkages, and low molecular weight aliphatic or aromatic ethers containing one or more ether linkages and combinations thereof. Reactive diluents are designed to modify strength and/or adhesion of the cured composition, such as aliphatic and/or aromatic mono, di, or tri epoxides having a weight average molecular weight of about 300 to about 1500, can be present in the range of up to about 30 weight percent of the total weight of the curable composition (preferably 5 to 10 percent).

The compositions of the present invention are typically liquid. By "liquid" is meant that the compositions have a viscosity that allows them to be at least extrudable. The compositions may have a viscosity that allows them to be at least pumpable, and often the compositions have a viscosity that allows them to be at least sprayable. Often the composition can be warm applied, for example, at a temperature of 40° C. to 60° C. to facilitate pumping, spraying, or extruding through a nozzle.

Liquid compositions that are suitable for use in the present invention include liquid resin systems that are 100 percent solids, liquid resins that are dissolved or dispersed in a liquid medium, and solid particulate resins that are dispersed in a liquid medium. Liquid media may be aqueous based or organic solvent based.

The curable compositions of the present invention can be prepared as a one-package composition. A one-package composition can be prepared in advance of use and stored.

The preparation of the curable composition can be done using mixing equipment known to those skilled in the art such as triaxial, Littleford, Sigma, and Hockmeyer mixers.

Substrates to which compositions of the present invention may be applied include rigid metal substrates such as titanium, ferrous metals, aluminum, aluminum alloys, copper, and other metal and alloy substrates. Non-limiting examples of useful steel materials include cold rolled steel, galvanized (zinc coated) steel, electrogalvanized steel, stainless steel, pickled steel, zinc-iron alloy such as GALVANNEAL, and combinations thereof. Combinations or composites of ferrous and non-ferrous metals can also be used. The composition is particularly suitable as an adhesive and is often applied between two substrates which may be the same or dissimilar The thickness of the substrates typically ranges from 0.127 to 3.175 millimeters (mm) (5 to 125 mils), typically 0.6 to 1.2 mm (23.6 to 47.2 mils) although the thickness can be greater or less, as desired. The width of a coil strip generally ranges from 30.5 to 183 centimeters (12 to 72 inches), although the width of the substrate can vary depending upon its shape and intended use.

Before depositing any treatment or coating compositions upon the surface of the substrates, it is common practice, though not necessary, to remove foreign matter from the surface by thoroughly cleaning and degreasing the surface. Such cleaning typically takes place after forming the substrate (stamping, welding, etc.) into an end-use shape. The surface of the substrate can be cleaned by physical or chemical means, such as mechanically abrading the surface or cleaning/degreasing with commercially available alkaline or acidic cleaning agents which are well known to those skilled in the art, such as sodium metasilicate and sodium hydroxide. A non-limiting example of a cleaning agent is CHEMKLEEN 163, an alkaline-based cleaner commercially available from PPG Industries, Inc.

Following the cleaning step, the substrate may be rinsed with deionized water or an aqueous solution of rinsing agents in order to remove any residue. The substrate can be air dried, for example, by using an air knife, by flashing off the water by brief exposure of the substrate to a high temperature or by passing the substrate between squeegee rolls.

The substrate to which the composition of the present invention is applied may be a bare, cleaned surface; it may be oily, pretreated with one or more pretreatment compositions, and/or prepainted with one or more coating compositions, primers, etc., applied by any method including, but not limited to, electrodeposition, spraying, dip coating, roll coating, curtain coating, and the like.

The composition may be applied to the substrate by one or more of a number of methods including spraying, extruding, brushing, or by hand with a blade. The composition has a viscosity that allows it to be at least extrudable. The compositions can be cured at a temperature of from about 75° C. to about 200° C., often from about 150° C. to about 180° C., for a period of time ranging from about 20 minutes to about 1 hour.

The compositions of the present invention is intended for use as an adhesive, such as between two substrates, effective over a wide temperature range, even at extreme temperatures as low as −40° C.

The following example is intended to illustrate an embodiment of the invention, and should not be construed as limiting the invention in any way.

Example

An adhesive composition was prepared by mixing together the compounds listed below in Table 1.

TABLE 1

| PREMIX | |
| --- | --- |
| EPON 828[1]/DIMER ACID | 71.8 |
| EPON 828/CTBN | 13.5 |
| JEFFAMINE D-400[2] (DIAMINE) | 4.25 |
| GLYCIDYL ESTER/CTBN ADDUCT | 11.5 |
| DICY | 6.2 |
| DIURON[3] | 0.4 |
| AGROL 4.0[4]/IPDI/DCHA | 3.25 |
| HDK H17 (FUMED SILICA)[5] | 1 |
| RAVEN 410 (CARBON BLACK)[6] | 0.06 |
| EPS-200 (GROUND RUBBER)[7] | 0.5 |

[1]Polyepoxide available from Hexion Specialty Chemicals
[2]Polyamine available from Huntsman Chemicals
[3]DIURON 3-(3,4-dichlorophenyl)-1,1-dimethylurea which is commercially available from DuPont de Nemours of Wilmington, Delaware
[4]4-functional, viscous, soybean-based polyol available from BioBased Technologies, LLC.
[5]Fumed silica available from Wacker Chemie AG
[6]Carbon black available from Columbian Chemicals Company
[7]EPS-200 ground vulcanized rubber, 200 micron average particle size, commercially available from Environmental Processing Systems, Inc. of Mineola, New York Viscosity: PHYSICA MCR 301 rheometer with 25 mm plate and 0.7 mm gap was used to measure viscosity at 55° C. as a function of increasing shear rate (0.1 to 100 s$^{-1}$). Samples were taken from the jar as is. Viscosity was measured initially, after 4 weeks and 8 weeks.

Test results appear in the table below:

TABLE 2

| Initial | 0.1 s$^{-1}$ | 97700 |
| --- | --- | --- |
|  | 10 s$^{-1}$ | 65100 |
|  | 100 s$^{-1}$ | 55600 |
| 4 wks. | 0.1 s$^{-1}$ | 98700 |
|  | 10 s$^{-1}$ | 71300 |
|  | 100 s$^{-1}$ | 62200 |
| 8 wks. | 0.1 s$^{-1}$ | 119000 |
|  | 10 s$^{-1}$ | 95200 |
|  | 100 s$^{-1}$ | 79400 |
| % change in 8 wks. Aging | | |
|  | 0.1 s$^{-1}$ | 22% |
|  | 10 s$^{-1}$ | 46% |
|  | 100 s$^{-1}$ | 43% |

Whereas particular embodiments of this invention have been described above for purposes of illustration, it will be evident to those skilled in the art that numerous variations of the details of the present invention may be made without departing from the scope of the invention as defined in the appended claims.

What is claimed is:

1. A curable, one-package, stable adhesive composition comprising:
   (a) a resin component comprising (i) a reaction product of a polyepoxide containing at least two epoxide groups per molecule with a carboxy-terminated butadiene acrylonitrile polymer and (ii) an optional polyepoxide containing at least two epoxide groups per molecule;
   (b) a polyamine having at least two primary amine, secondary amine, and/or ketimine functional groups; and
   (c) a curing component comprising dicyandiamide and an accelerator; wherein the accelerator comprises a reaction product of a renewable polyol, a diisocyanate, and a dialkyl monoamine containing alkyl groups with at least two carbon atoms each.

2. The composition of claim 1 wherein the resin component (a) further comprises a reaction product of a polyepoxide and dimer acid.

3. The composition of claim 2 wherein the dimer acid is derived from a renewable fatty acid.

4. The composition of claim 1 wherein the resin component (a) further comprises a reaction product of epichlorohydrin and carboxy-terminated butadiene acrylonitrile polymer.

5. The composition of claim 1 wherein the resin component (a) further comprises a polyester polymer derived from a renewable source.

6. The composition of claim 1 wherein the polyamine (b) comprises a polyether having at least two primary amine, secondary amine, and/or ketimine functional groups.

7. The composition of claim 1, wherein the optional polyepoxide is present, and both the optional polyepoxide and the polyepoxide used to prepare the reaction product comprise an epoxy polyether, a polyglycidyl ether of one or more polyhydric alcohols, a polyglycidyl ester of one or more polycarboxylic acids, epoxidized olefinically unsaturated alicyclic compounds, a polyepoxide containing oxyalkylene groups, and/or an epoxy novolac resin.

8. The composition of claim 7, wherein both the optional polyepoxide and the polyepoxide used to prepare the reaction product comprise a polyglycidyl ether of Bisphenol A.

9. The composition of claim 1, wherein the renewable polyol used to prepare the accelerator comprises a hydroxyl functional polymer derived from castor oil, peanut oil, soy bean oil and/or canola oil.

10. The composition of claim 9, wherein the dialkyl monoamine used to prepare the accelerator comprises dicyclohexylamine, diethylamine, diisopropyl amine, and/or dibutylamine.

11. The composition of claim 9, wherein the accelerator further comprises a polyurea functional reaction product of a polyamine, a diisocyanate, and a dialkyl monoamine containing alkyl groups with at least two carbon atoms each.

12. The composition of claim 11, wherein the polyurea functional reaction product is a reaction product of a polyether functional polyamine having at least two amine functional groups; a diisocyanate; and a dialkyl monoamine comprising dicyclohexylamine, diethylamine, diisopropyl amine, and/or dibutylamine.

13. The composition of claim 1, wherein the curing component (c) further comprises a urea functional compound and/or an imidazole functional compound.

14. The composition of claim 1, wherein the accelerator is present in the composition in an amount ranging from 0.5 to 30 percent by weight, based on the total weight of the composition.

15. The composition of claim 1, further comprising a fibrous filler.

16. The composition of claim 15, wherein the fibrous filler is present in an amount ranging from 1 to 15 percent by weight based on the total weight of the composition.

17. A curable, one-package, stable adhesive composition comprising:
  (a) a resin component comprising (i) a reaction product of a polyepoxide containing at least two epoxide groups per molecule with a carboxy-terminated butadiene acrylonitrile polymer, (ii) a reaction product of a polyepoxide containing at least two epoxide groups per molecule with a polyamine having at least two primary amine, secondary amine, and/or ketimine functional groups, and (iii) an optional polyepoxide containing at least two epoxide groups per molecule; and
  (b) a curing component comprising dicyandiamide and an accelerator; wherein the accelerator comprises a reaction product of a renewable polyol, a diisocyanate, and a dialkyl monoamine containing alkyl groups with at least two carbon atoms each.

18. The composition of claim 17 wherein the amine to epoxy equivalent ratio is 0.05:1 to 0.5:1.

* * * * *